(12) United States Patent
Rood et al.

(10) Patent No.: US 11,286,992 B2
(45) Date of Patent: Mar. 29, 2022

(54) SEALING BOOT FOR SEALING A JOINT OF FRONT DIFFERENTIALS

(71) Applicants: Richard Bruce Rood, Cambridge (CA); Rood Bruce Allen, Waterville (CA)

(72) Inventors: Richard Bruce Rood, Cambridge (CA); Rood Bruce Allen, Waterville (CA)

(*) Notice: Subject to any disclaimer, the term of this patent is extended or adjusted under 35 U.S.C. 154(b) by 313 days.

(21) Appl. No.: 16/519,470

(22) Filed: Jul. 23, 2019

(65) Prior Publication Data

US 2020/0032854 A1    Jan. 30, 2020

(30) Foreign Application Priority Data

Jul. 27, 2018   (CA) ................................ CA 3012644

(51) Int. Cl.
*F16J 15/52* (2006.01)
*F16D 3/84* (2006.01)

(52) U.S. Cl.
CPC .............. *F16D 3/843* (2013.01); *F16J 15/52* (2013.01); *F16D 2200/0056* (2013.01)

(58) Field of Classification Search
CPC .... F16D 3/843; F16D 2200/0056; F16J 15/52
See application file for complete search history.

(56) References Cited

U.S. PATENT DOCUMENTS

| 3,744,324 | A | * | 7/1973 | Perkins | H01H 33/565 74/18.1 |
|---|---|---|---|---|---|
| 3,807,110 | A | * | 4/1974 | Kaminski | E04D 13/1407 52/219 |
| 3,866,950 | A | * | 2/1975 | Skoch | F16L 21/002 285/4 |
| 4,120,129 | A | * | 10/1978 | Nagler | E04D 13/1407 285/4 |
| 4,407,517 | A | * | 10/1983 | Neyer | H01F 7/1607 277/634 |
| 2004/0262845 | A1 | * | 12/2004 | Matsui | F16J 15/3228 277/349 |

(Continued)

FOREIGN PATENT DOCUMENTS

| CA | 2731076 A1 | * | 1/2010 | ............... B04B 7/08 |
|---|---|---|---|---|
| CN | 107781423 A | * | 3/2018 | |
| DE | 102006049352 B3 | * | 7/2008 | ............. F16H 48/10 |

*Primary Examiner* — Vishal A Patel
(74) *Attorney, Agent, or Firm* — Thompson Hine LLP

(57) ABSTRACT

A sealing boot for sealing a joint of 8 & 8¼ front differentials, where the sealing boot comprises a first sealing boot section having a first cylindrical inside surface. The first sealing boot section is adapted for being tightly fitted to a shoulder section of an end portion of a differential output shaft protruding a housing of the 8 & 8¼ front differential. The shoulder section is disposed between a male spline and the housing. A second sealing boot section has a second cylindrical inside surface. The second sealing boot section is adapted for being tightly fitted to an outside surface section of an end portion of a CV axle shaft having a female spline disposed therein. The female spline being adapted for being engaged with the male spline of the differential output shaft. The sealing boot forms a sealed enclosure between the first cylindrical inside surface and the second cylindrical inside surface.

16 Claims, 5 Drawing Sheets

Section A-A

(56) References Cited

U.S. PATENT DOCUMENTS

2014/0131956 A1\* 5/2014 Snethun ............... E02D 5/72
 277/636
2019/0266479 A1\* 8/2019 Singh ................ G06F 17/16

\* cited by examiner

Section A-A

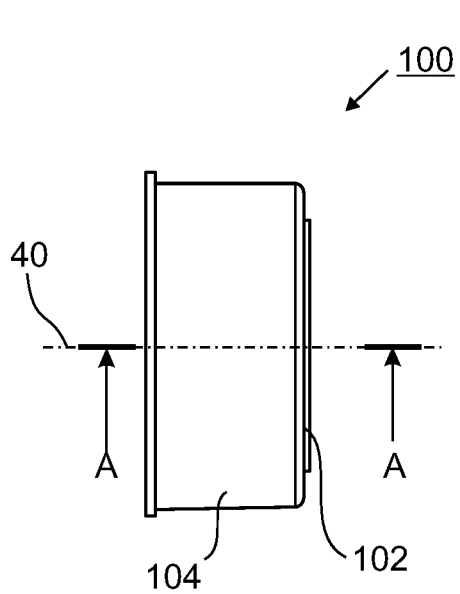
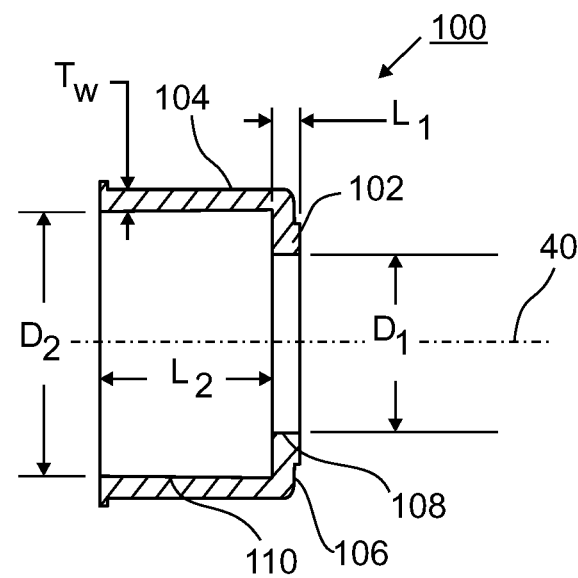
Figure 4a
Section A-A
Figure 4b
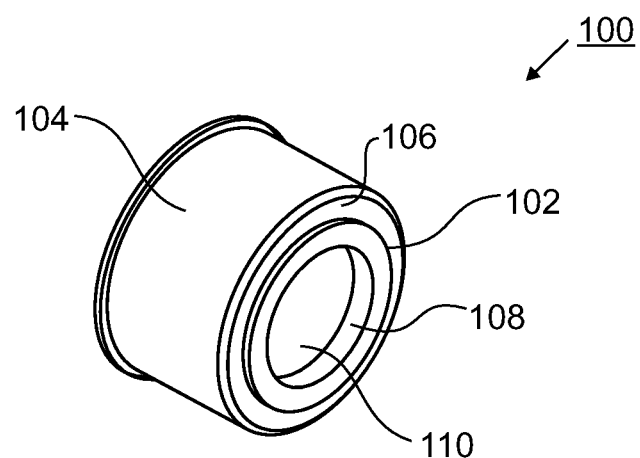
Figure 4c

SEALING BOOT FOR SEALING A JOINT OF FRONT DIFFERENTIALS

This application claims priority to Canada Patent Application No. 3,012,644 filed on Jul. 27, 2018, the entire contents of which are hereby incorporated by reference.

TECHNICAL FIELD

The present disclosure relates to a seal for sealing a joint of Dodge 8 & 8¼ front differentials, and more particularly to a sealing boot for sealing a joint between a differential output shaft of Dodge 8 & 8¼ front differentials and a CV axle shaft and a method for installing the same.

BACKGROUND

The four-wheel drive versions of Dodge RAM 1500 and Dodge Dakota models (e.g. vehicles sold under the DODGE® trademark owned by FCA US LLC of Auburn Hills, Mich.) comprise one of a Dodge 8 or 8¼ front differential—both will be referred to as "Dodge front differential" from hereon—connected to respective left-hand side and right-hand side Constant Velocity (CV) axle shafts for driving the front wheels. The CV axle shafts are connected to respective output shafts of the Dodge front differential via spline joints which are each protected from adverse outside conditions using a single O-ring seal.

For model years 2002 until present, owners, dealers, and mechanics of Dodge RAM 1500 and Dodge Dakota models frequently experience issues with respect to the joint between the differential output shaft and the CV axle shaft, in particular when the vehicles are exposed to winter driving conditions.

In winter driving conditions the vehicles are typically exposed to substantial amounts of road salt and road salt water solutions against which the single O-ring seal is not capable of providing sufficient protection, resulting in corrosion and, consequently, failure of the splines. Repair typically requires replacement of the differential output shafts and the CV axle shaft, which is expensive and time consuming.

It may be desirable to provide a seal that is capable of protecting the joint between the differential output shaft of a Dodge front differential and the CV axle shaft in winter driving conditions.

It may also be desirable to provide a sealing boot that is capable of protecting the joint between the differential output shaft of a Dodge front differential and the CV axle shaft in winter driving conditions and that is simple to install.

It may also be desirable to provide a sealing boot that is capable of protecting the joint between the differential output shaft of a Dodge front differential and the CV axle shaft in winter driving conditions and that provides a tight seal without additional fasteners.

SUMMARY

Accordingly, one object is to provide a seal that is capable of protecting the joint between the differential output shaft of a Dodge front differential and the CV axle shaft in winter driving conditions.

Another object is to provide a sealing boot that is capable of protecting the joint between the differential output shaft of a Dodge front differential and the CV axle shaft in winter driving conditions.

Another object is to provide a sealing boot that is capable of protecting the joint between the differential output shaft of a Dodge front differential and the CV axle shaft in winter driving conditions and that provides a tight seal without additional fasteners.

According to one aspect, there is provided a sealed joint for a Dodge front differential. The sealed joint comprises a differential output shaft having an end portion protruding a housing of the Dodge front differential. The end portion comprises a male spline and a shoulder section disposed between the spline and the housing. A CV axle shaft has an end portion comprising a female spline disposed therein. The female spline is engaged with the male spline of the differential output shaft. A sealing boot has a first inside surface and a second inside surface. The first inside surface and the second inside surface are tightly fitted to the shoulder section of the differential output shaft and an outside surface section of the end portion of the CV axle shaft, respectively. The sealing boot provides a substantially sealed enclosure between the shoulder section of the differential output shaft and the outside surface section of the end portion of the CV axle shaft.

According to one aspect, there is provided a sealing boot for sealing a joint of a Dodge front differential. The sealing boot comprises a first sealing boot section having a first cylindrical inside surface. The first sealing boot section is adapted for being tightly fitted to a shoulder section of an end portion of a differential output shaft protruding a housing of the Dodge front differential. The shoulder section is disposed between a male spline and the housing. A second sealing boot section has a second cylindrical inside surface. The second sealing boot section is adapted for being tightly fitted to an outside surface section of an end portion of a CV axle shaft having a female spline disposed therein. The female spline being adapted for being engaged with the male spline of the differential output shaft. The sealing boot forms a sealed enclosure between the first cylindrical inside surface and the second cylindrical inside surface.

According to one aspect, there is provided a method for sealing a joint of a Dodge front differential. An end portion of a differential output shaft protrudes a housing of the Dodge front differential. The end portion comprises a male spline and a shoulder section disposed between the spline and the housing. A CV axle shaft has an end portion comprising a female spline disposed therein. The female spline is adapted for being engaged with the male spline of the differential output shaft. A sealing boot comprises a first sealing boot section having a first cylindrical inside surface and a second sealing boot section having a second cylindrical inside surface. One of the first cylindrical inside surface and the second cylindrical inside surface is fitted onto the shoulder section of the differential output shaft and an outside surface section of the end portion of the CV axle shaft, respectively. The female spline of the CV axle shaft is engaged with the male spline of the differential output shaft. During engaging of the female spline with the male spline the other of the first cylindrical inside surface and the second cylindrical inside surface is fitted onto the shoulder section of the differential output shaft and an outside surface section of the end portion of the CV axle shaft, respectively.

An advantage of the present system and method is that it provides a seal that is capable of protecting the joint between the differential output shaft of a Dodge front differential and the CV axle shaft in winter driving conditions.

A further advantage is that it provides a sealing boot that is capable of protecting the joint between the differential output shaft of a Dodge front differential and the CV axle shaft in winter driving conditions and that is simple to install.

A further advantage is to provide a sealing boot that is capable of protecting the joint between the differential output shaft of a Dodge front differential and the CV axle shaft in winter driving conditions and that provides a tight seal without additional fasteners.

BRIEF DESCRIPTION OF THE DRAWINGS

An embodiment is described below with reference to the accompanying drawings, in which:

FIG. 1b is a simplified block diagram illustrating a perspective view of a CV axle shaft for being connected to the differential output shaft illustrated in FIG. 1a;

FIGS. 4a to 4c are simplified block diagrams illustrating in a side view, a cross-sectional view, and a perspective view, respectively, another sealing boot of the sealed joint for a Dodge front differential according to an embodiment.

DETAILED DESCRIPTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, certain methods and materials are now described.

Figure 1A:
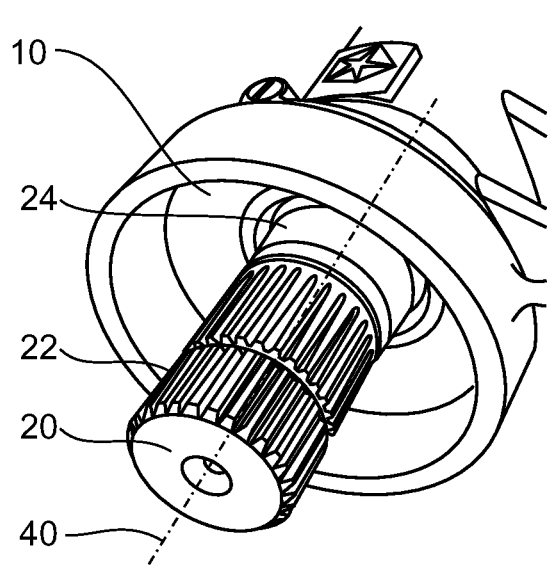
FIG. 1a is a simplified block diagram illustrating a perspective view of a differential output shaft having an end portion protruding the housing of a Dodge front differential.
Figure 1B:
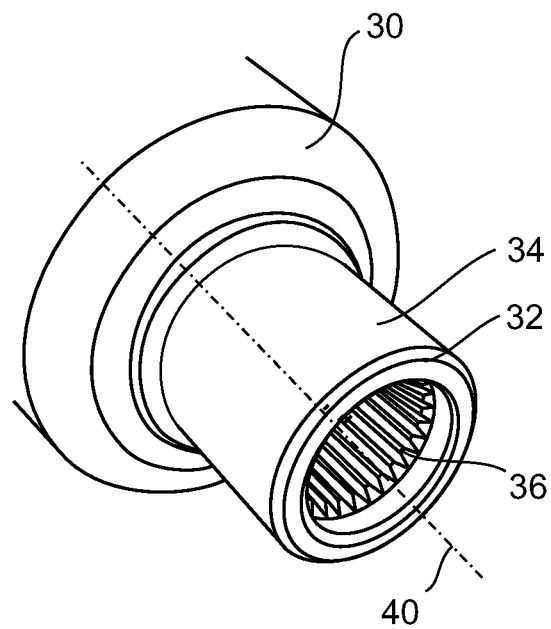
Figure 1C:
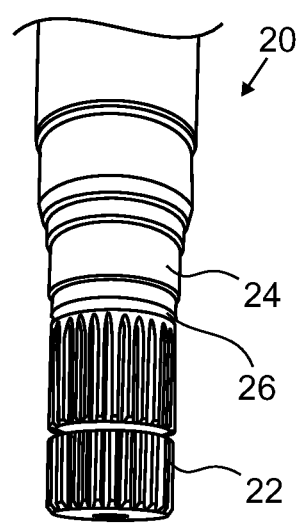
FIGS. 1c and 1d are simplified block diagrams illustrating perspective views of two different versions of the differential output shaft.
Figure 1D:
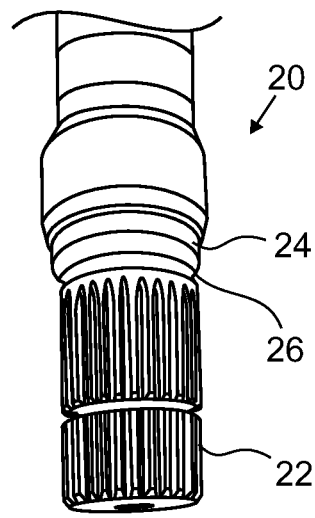

FIGS. 1a to 1d illustrate a joint for a Dodge front differential which is employed for connecting the Dodge front differential to respective right-hand side and left-hand side CV axle shafts for driving the front wheels. FIGS. 1a and 1b illustrate differential output shaft 20 having an end portion protruding the housing 10 of the Dodge front differential and CV axle shaft 30, respectively. The end portion of the differential output shaft 20 comprises male spline 22 and a shoulder section 24 disposed between the spline 22 and the housing 10. The CV axle shaft 30 has an end portion 32 comprising a female spline 36 disposed therein. When connected, the female spline 36 is engaged with the male spline 22 of the differential output shaft 20 along axis 40. For maintenance and repair, the CV axle shaft 30 is disconnected from the end portion of the differential output shaft 20, i.e. from the front differential, by simply pulling the end portion 32 thereof along the axis 40, and is reconnected by simply pushing the end portion 32 of the CV axle shaft 30 onto the end portion of the differential output shaft 20 along the axis 40 until the male spline 22 is engaged with the female spline 36 in a locked position. FIG. 1c illustrates the differential output shaft 20 employed on the right-hand side of the Dodge front differential for model years 2012 and newer, while FIG. 1d illustrates the differential output shaft 20 employed on the left-hand side of the Dodge front differential for model years 2002 and newer and on the right-hand side for model years 2002 to 2011. The differential output shafts 20 illustrated in FIGS. 1c and 1d differ only in that the shoulder section 24 of differential output shaft 20 illustrated in FIG. 1c is wider. When connected, the splines 22 and 36 are protected from adverse outside conditions via a single O-ring seal disposed in groove 26 placed between the male spline 22 and the shoulder section 24. Unfortunately, the single O-ring seal is not capable of providing sufficient protection against road salt and road salt water solutions, resulting in corrosion and, consequently, failure of the splines 22 and 36.

Referring to FIGS. 2a to 2d, 3a to 3c, and 4a to 4c a sealing boot 100 according to an embodiment is provided. The sealing boot 100 comprises first sealing boot section 102 having a first cylindrical inside surface 108, second sealing boot section 104 having a second cylindrical inside surface 110, and third sealing boot section 106 connecting the first sealing boot section 102 with the second sealing boot section 104.

Figure 2A:
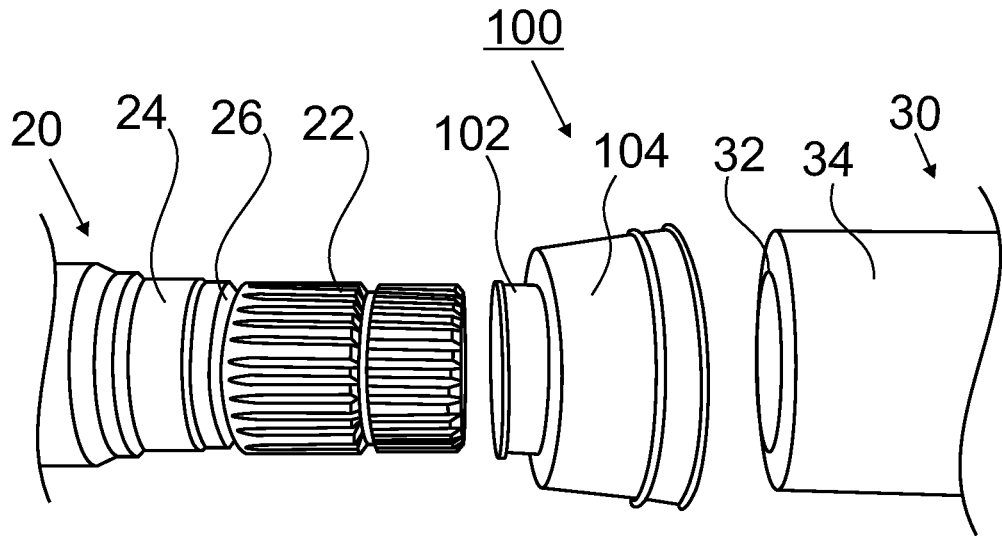
FIG. 2a is a simplified block diagram illustrating a perspective view of components of a sealed joint for a Dodge front differential according to an embodiment.
Figure 2B:
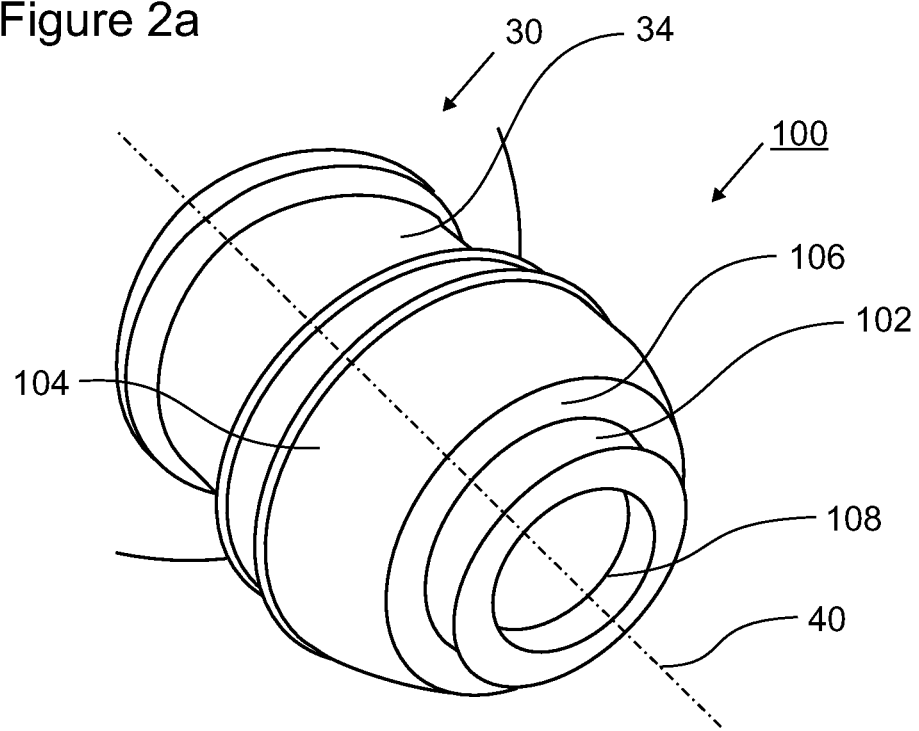
FIG. 2b is a simplified block diagram illustrating in a perspective view the sealing boot mounted to an outside surface section of an end portion of the CV axle shaft of the sealed joint for a Dodge front differential according to an embodiment.
Figure 2C:
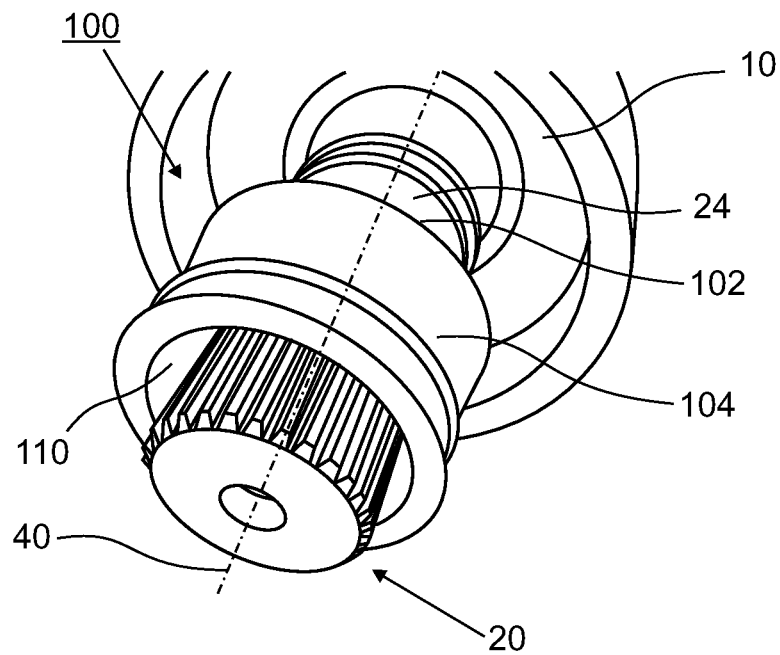
FIG. 2c is a simplified block diagram illustrating in a perspective view the sealing boot mounted to the differential output shaft of the sealed joint for a Dodge front differential according to an embodiment.
Figure 2D:
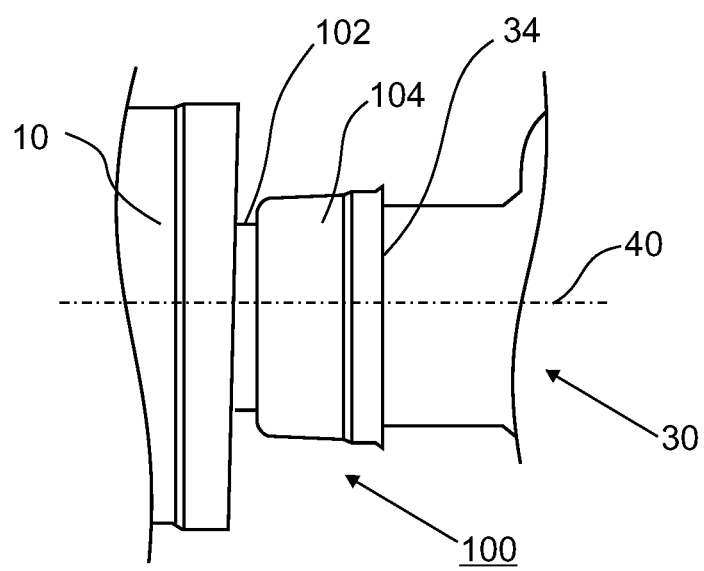
FIG. 2d is a simplified block diagram illustrating in a perspective view the assembled sealed joint for a Dodge front differential according to an embodiment.

The first sealing boot section 102 is adapted for being tightly fitted to shoulder section 24 of the differential output shaft 20, as illustrated in FIGS. 2a and 2c, while the second sealing boot section 104 is adapted for being tightly fitted to outside surface section 34 of the end portion 32 of the CV axle shaft 30, as illustrated in FIGS. 2a and 2b. When installed, as illustrated in FIG. 2d, the sealing boot 100 forms a sealed enclosure between the first cylindrical inside surface 108—in tight sealing contact with the shoulder section 24 of the differential output shaft 20—and the second cylindrical inside surface 110—in tight sealing contact with the outside surface section 34 of the end portion 32 of the CV axle shaft 30.

The sealing boot 100 is simply installed, for example, as a retro-fit during a regular service interval or after replacement of the splines, in relatively short time and at substantially low cost. After disengaging the female spline 36 of the CV axle shaft 30 from the male spline 22 of the differential output shaft 20, as described hereinabove, and removing of the O-ring, the sealing boot 100 is installed as follows. The second sealing boot section 104 can be first fitted to the outside surface section 34, for example, by stretching and pulling/pushing the same onto the outside surface section 34 until the third sealing boot section 106 is in close proximity to or in contact with the end of the end portion 32 of the CV axle shaft 30. After the second sealing boot section 104 is fitted to the outside surface section 34, as illustrated in FIG. 2b, the female spline 36 of the CV axle shaft 30 is engaged with the male spline 22 of the differential output shaft 20 until the male spline 22 is engaged with the female spline 36 in a locked position, as described hereinabove. While the female spline 36 of the CV axle shaft 30 is engaged with the male spline 22 of the differential output shaft 20, the first sealing boot section 102 is fitted onto the shoulder section 24 of the differential output shaft 20, for example, by stretching and pulling/pushing the same onto the shoulder section 24. Alternatively, the sealing boot 100 may be installed in reverse order, i.e. the first sealing boot section 102 is fitted onto the shoulder section 24 of the differential output shaft 20 before engaging the splines.

The original O-ring seal is omitted since the seal protecting the splines is provided by the sealing boot 100 but may still be employed depending on user preference.

The sealing boot 100 is made of an elastic material that has sufficient elasticity for enabling sufficient stretching for fitting and sufficient strength for forming a substantially tight seal when fitted to prevent egress of lubricant and ingress of water, salt and other outside elements absent additional fasteners such as, for example, hose clamps.

The sealing boot 100 can be made of an elastic material that is durable when exposed to various materials—such as, for example, water, salt, oil, grease, transmission fluid that may come in contact therewith during regular use of the vehicle—in a conventional manner using standard plastic moulding technology.

Figure 3A:
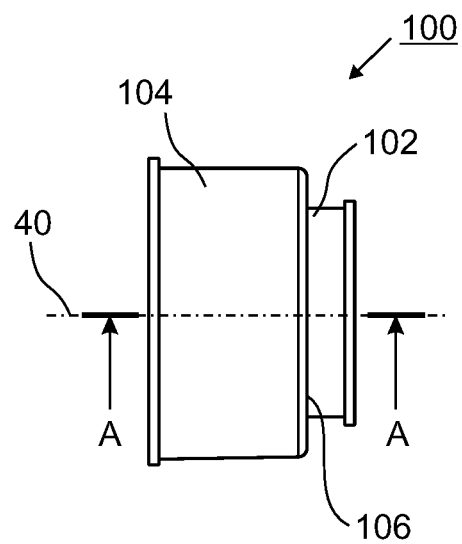
FIGS. 3a to 3c are simplified block diagrams illustrating in a side view, a cross-sectional view, and a perspective view, respectively, a sealing boot of the sealed joint for a Dodge front differential according to an embodiment.
Figure 3B:
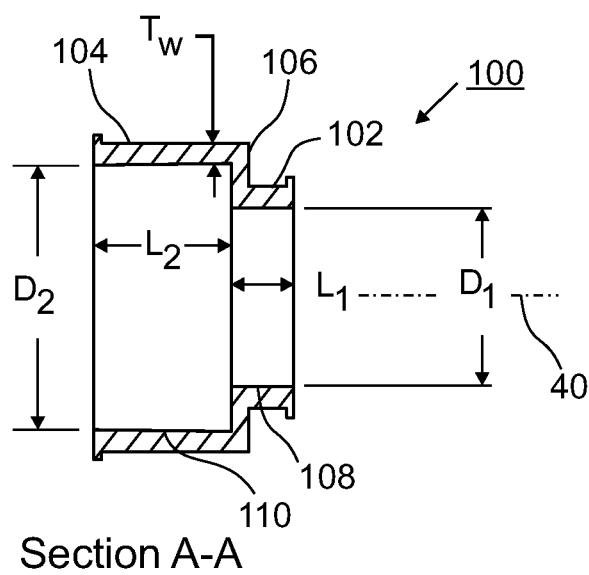
Figure 3C:
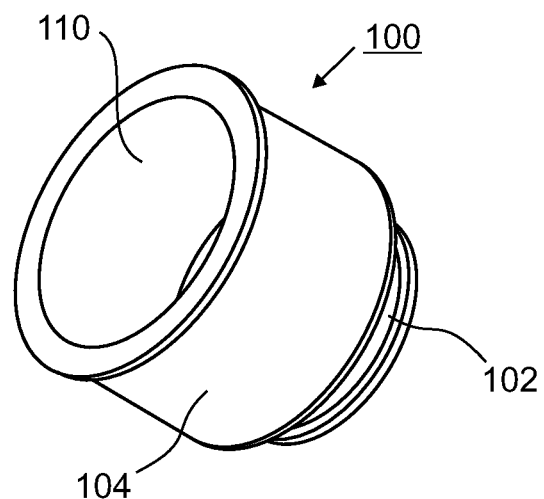

In one implementation the sealing boot 100 is made of black rubber 'Nitrile 60 Durometer' having a Tensile of 2000 psi, an Elongation at Break of 350% and a 300% Modulus 2080.9 and has the dimensions as illustrated in FIGS. 3a to 3c—diameter $D_1$=1 inch; diameter $D_2$=1.5 inch; length $L_1$=0.45 inch; length $L_2$=1 inch; and wall thickness $T_W$=0.125 inch—for fitting with the shoulder section 24 of the differential output shaft 20 illustrated in FIG. 1c and in FIGS. 4a to 4c—diameter $D_1$=1 inch; diameter $D_2$=1.5 inch; length $L_1$=0.175 inch; length $L_2$=1 inch; and wall thickness $T_W$=0.125 inch—for fitting with the shoulder section 24 of the differential output shaft 20 illustrated in FIG. 1d.

It is noted that the length $L_1$ is limited by the size of the shoulder section 24 and is, in one case, determined to be approximately equal thereto while the length $L_2$ may be varied more widely, for example in the range between 0.75 inch and 1.5 inch, such that a proper seal is ensured while at the same time preventing unnecessary fitting efforts.

In order to ensure a tight fit the diameters $D_1$ and $D_2$ are determined to be 0.2 inch to 0.3 inch smaller than a respective outside diameter of the shoulder section 24 of the differential output shaft 20 and the outside surface section 34 of the CV axle shaft 30. In the above implementation the difference is 0.25 inch.

It is noted that the sizes of the sealing boot 100 may be adapted to adjust to changes in the dimensions of the differential output shaft 20 and/or the CV axle shaft 30 depending the manufacturer's design preferences.

The present invention has been described herein with regard to certain embodiments. However, it will be obvious to persons skilled in the art that a number of variations and modifications can be made without departing from the scope of the invention as described herein.

What is claimed is:

1. A sealed joint for a front differential comprising:
   a differential output shaft having an end portion protruding a housing of the front differential, the end portion comprising a male spline and a shoulder section disposed between the spline and the housing;
   a CV axle shaft having an end portion comprising a female spline disposed therein, the female spline being engaged with the male spline of the differential output shaft;
   a sealing boot having a first sealing boot section having a first inside surface and a second sealing boot section having a second inside surface, the first inside surface and the second inside surface being tightly fitted to the shoulder section of the differential output shaft and an outside surface section of the end portion of the CV axle shaft, respectively, the sealing boot providing a substantially sealed enclosure between the shoulder section of the differential output shaft and the outside surface section of the end portion of the CV axle shaft; and,
   wherein the first inside surface has a diameter that is smaller than a diameter of the second inside surface, wherein the first inside surface has an axial length that is less than an axial length of the second inside surface, wherein the sealing boot comprises the first sealing boot section, the second sealing boot section, and a third sealing boot section connecting the first sealing boot section with the second sealing boot section, the third sealing boot section comprising a single wall oriented substantially perpendicular to a longitudinal axis of the sealing boot, wherein the sealing boot has an axial length between 0.925 inch and 1.95 inch, wherein an axial length of the second sealing boot section is in the range between 0.75 inch and 1.5 inch, and wherein an axial length of the first sealing boot section is approximately 0.175 inch or approximately 0.45 inch.

2. The sealed joint according to claim 1 wherein the sealing boot is made of an elastic material.

3. The sealed joint according to claim 2 wherein the elastic material is a durable rubber material.

4. The sealed joint according to claim 1 wherein the diameter of the first inside surface is approximately 1 inch, and wherein the diameter of the second inside surface is approximately 1.5 inch.

5. A sealing boot for sealing a joint of a front differential comprising:
   a first sealing boot section having a first cylindrical inside surface, the first sealing boot section being adapted for being tightly fitted to a shoulder section of an end portion of a differential output shaft protruding a housing of the front differential, the shoulder section being disposed between a male spline and the housing; and,
   a second sealing boot section having a second cylindrical inside surface, the second sealing boot section being adapted for being tightly fitted to an outside surface section of an end portion of a CV axle shaft having a female spline disposed therein, the female spline being adapted for being engaged with the male spline of the differential output shaft; and the first sealing boot section and the second sealing boot section have sufficient strength for forming a tight seal when fitted to the shoulder section and the outside surface section, respectively, such that the sealing boot forms a sealed enclosure between the first cylindrical inside surface and the second cylindrical inside surface,
   wherein the first inside surface has a diameter that is smaller than a diameter of the second inside surface, wherein the first inside surface has an axial length that is less than an axial length of the second inside surface, wherein the sealing boot comprises the first sealing boot section, the second sealing boot section and a third sealing boot section connecting the first sealing boot section with the second sealing boot section, the third sealing boot section comprising a single wall oriented substantially perpendicular to a longitudinal axis of the sealing boot, wherein the sealing boot has an axial length between 0.925 inch and 1.95 inch, wherein an axial length of the second sealing boot section is in the range between 0.75 inch and 1.5 inch, and wherein an axial length of the first sealing boot section is approximately 0.175 inch or approximately 0.45 inch.

6. The sealing boot according to claim 5 made of an elastic material.

7. The sealing boot according to claim 6 wherein the elastic material has sufficient elasticity for fitting and sufficient strength for forming a tight seal when fitted.

8. The sealing boot according to claim 7 wherein the elastic material is a durable rubber material.

9. The sealing boot according to claim 8 wherein the elastic material is 60 Durometer Nitrile.

10. The sealing boot according to claim 5 wherein the diameter of the first inside surface is approximately 1 inch, and wherein the diameter of the second inside surface is approximately 1.5 inch.

11. The sealing boot according to claim 5 wherein an axial length of the second sealing boot section is approximately 1.0 inch.

12. The sealing boot according to claim 10 wherein the first cylindrical inside surface and the second cylindrical inside surface each has an inside diameter that is 0.2 inch to 0.3 inch smaller than a respective outside diameter of the shoulder section of the differential output shaft and the outside surface section of the CV axle shaft.

13. A method for sealing a joint of a front differential comprising:
   a) providing a differential output shaft having an end portion protruding a housing of the front differential, the end portion comprising a male spline and a shoulder section disposed between the spline and the housing;
   b) providing a CV axle shaft having an end portion comprising a female spline disposed therein, the female spline being adapted for being engaged with the male spline of the differential output shaft;
   c) providing a sealing boot comprising a first sealing boot section having a first cylindrical inside surface and a second sealing boot section having a second cylindrical inside surface, wherein the first inside surface has a diameter that is smaller than a diameter of the second inside surface, wherein the first inside surface has an axial length that is less than an axial length of the second inside surface, wherein the sealing boot comprises the first sealing boot section, the second sealing boot section and a third sealing boot section connecting the first sealing boot section with the second sealing boot section, the third sealing boot section comprising a single wall oriented substantially perpendicular to a longitudinal axis of the sealing boot, wherein the sealing boot has an axial length between 0.925 inch and 1.95 inch, wherein an axial length of the second sealing boot section is in the range between 0.75 inch and 1.5 inch, and wherein an axial length of the first sealing boot section is approximately 0.175 inch or approximately 0.45 inch;
   d) fitting one of the first cylindrical inside surface and the second cylindrical inside surface onto the shoulder section of the differential output shaft and an outside surface section of the end portion of the CV axle shaft, respectively;
   e) engaging the female spline of the CV axle shaft with the male spline of the differential output shaft; and,
   f) fitting the other of the first cylindrical inside surface and the second cylindrical inside surface onto the shoulder section of the differential output shaft and an outside surface section of the end portion of the CV axle shaft, respectively, while engaging the female spline with the male spline.

14. The method according to claim 13 wherein in d) the second cylindrical inside surface is fitted onto the outside surface section of the end portion of the CV axle shaft and wherein in f) the first cylindrical inside surface is fitted onto the shoulder section of the differential output shaft.

15. The method according to claim 13 comprising disengaging the female spline of the CV axle shaft from the male spline of the differential output shaft.

16. The method according to claim 13 wherein e) and f) are performed until the male spline is engaged with the female spline in a locked position.

* * * * *

UNITED STATES PATENT AND TRADEMARK OFFICE
CERTIFICATE OF CORRECTION

| | |
|---|---|
| PATENT NO. | : 11,286,992 B2 |
| APPLICATION NO. | : 16/519470 |
| DATED | : March 29, 2022 |
| INVENTOR(S) | : Richard Bruce Rood and Bruce Allen Rood |

It is certified that error appears in the above-identified patent and that said Letters Patent is hereby corrected as shown below:

On the Title Page

(72) Inventors: name of the second Inventor reads:
"Rood Bruce Allen"
Should read:
--Bruce Allen Rood--

Signed and Sealed this
Twenty-fourth Day of May, 2022

Katherine Kelly Vidal
*Director of the United States Patent and Trademark Office*